United States Patent
Lando

(10) Patent No.: US 8,253,358 B2
(45) Date of Patent: Aug. 28, 2012

(54) DEVICE AND METHOD FOR SUPPLYING ELECTRICAL POWER TO AT LEAST ONE INDUCTION MACHINE ON BOARD AN AIRCRAFT

(75) Inventor: Jean-Louis Lando, Saverdun (FR)

(73) Assignee: Airbus Operations SAS, Toulouse (FR)

( * ) Notice: Subject to any disclaimer, the term of this patent is extended or adjusted under 35 U.S.C. 154(b) by 584 days.

(21) Appl. No.: 12/444,399

(22) PCT Filed: Sep. 17, 2007

(86) PCT No.: PCT/EP2007/059773
§ 371 (c)(1),
(2), (4) Date: Aug. 4, 2009

(87) PCT Pub. No.: WO2008/046701
PCT Pub. Date: Apr. 24, 2008

(65) Prior Publication Data
US 2010/0013300 A1    Jan. 21, 2010

(30) Foreign Application Priority Data

Oct. 17, 2006 (FR) ..................... 06 54318

(51) Int. Cl.
*H02P 1/00* (2006.01)
(52) U.S. Cl. ......................... 318/266; 318/732
(58) Field of Classification Search .................. 318/266, 318/732; 310/156.08; 323/89
See application file for complete search history.

(56) References Cited

U.S. PATENT DOCUMENTS
2005/0258693 A1 * 11/2005 Stevens et al. ........... 310/156.08

FOREIGN PATENT DOCUMENTS
| DE | 30 46 164 | 7/1982 |
|---|---|---|
| DE | 33 24 687 | 12/1984 |
| EP | 0 117 881 | 9/1984 |
| JP | 61 98191 | 5/1986 |

* cited by examiner

*Primary Examiner* — Karen Masih
(74) *Attorney, Agent, or Firm* — Oblon, Spivak, McClelland, Maier & Neustadt, L.L.P.

(57) ABSTRACT

A device and a method for supplying electrical power to at least one induction machine on board an aircraft. This device includes at least one CVFR type source, in which the voltage and frequency are both variable but in a constant ratio, that supplies power to at least one induction machine.

12 Claims, 4 Drawing Sheets

DEVICE AND METHOD FOR SUPPLYING ELECTRICAL POWER TO AT LEAST ONE INDUCTION MACHINE ON BOARD AN AIRCRAFT

TECHNICAL DOMAIN

The invention relates to a device and a method for supplying electrical power to at least one induction machine on board an aircraft.

The following description will be given for an airplane type of aircraft, as an example to simplify the description.

STATE OF PRIOR ART

An induction machine (asynchronous motor) is an electromechanical actuator widely used in the aeronautical field. Such a machine has many advantages due to its simple operating principle, its robustness and its ease of manufacturing.

Aircraft system architectures make wide use of three-phase asynchronous motors in applications in which mechanical loads have to be driven, such as hydraulic pumps, fuel pumps or fans.

Initially, there were no particular problems with the power supply for induction machines using electrical distribution bars because the voltage and frequency were both kept constant (115 volts ac, 400 Hz). But with the continuously increasing demand for availability of aircraft systems, onboard electrical networks are gradually being changed to variable frequency networks (360 Hz-800 Hz), which simplifies electrical power generation systems and makes them more reliable.

But when the power supply frequency of an induction machine is increased over a wide frequency range while keeping the voltage constant, the maximum flux in the air gap and therefore the maximum mechanical torque output by the machine decrease in very high proportions for high frequencies: the maximum torque decreases with the square of the frequency. Therefore, a <<direct>> power supply to such a machine through a variable frequency network increases the mass and degrades the efficiency, which is unacceptable.

One possible solution for solving such a technical problem is to add a static converter (power electronics) between the variable frequency distribution bar and the induction machine so as to restore a fixed voltage and frequency by transformation of the electrical energy. Such a solution has the advantage that it makes it possible to continue using induction machines in aircraft using variable frequency onboard networks. However, with this solution, it is necessary to add a static converter with two transformation stages (rectifier+inverter) to the induction machine, which reduces the reliability of the system by an order of magnitude.

The purpose of this invention is to solve such a technical problem by proposing a device and a method for supplying electrical power to at least one induction machine on board an aircraft, which is a simple and reliable solution, without increasing the mass and without any power electronics.

PRESENTATION OF THE INVENTION

The invention relates to a device for supplying electrical power to at least one induction machine on board an aircraft, for example an airplane, in which a variable frequency electrical distribution bar supplies the at least one induction machine, characterised in that it comprises at least one CVFR type source in which the voltage and frequency are both variable but in a constant ratio, that supplies power to at least one induction machine, the at least one induction machine being an asynchronous motor with at least two cages, or an asynchronous motor with deep slots.

In a first embodiment, the device according to the invention comprises a permanent magnet alternator.

In a second embodiment, the device according to the invention comprises a VFG type alternator controlled by a control generator.

In a third embodiment, the device according to the invention comprises an induction regulator and an angular position regulation loop that advantageously comprises a divider, a means of comparing with a reference value, a low power inverter and an angular positioning actuator.

The invention also concerns a method for supplying electrical power to at least one induction machine on board an aircraft, for example an airplane, in which a variable frequency electrical distribution bar powers the at least one induction machine, characterised in that this at least one induction machine is powered by at least one CVFR type source, in which the voltage and frequency are both variable but in a constant ratio, and in that the at least one induction machine is an asynchronous motor with at least one cage or an asynchronous motor with deep slots.

In a first embodiment, a permanent magnet alternator is used to make a CVFR type source.

In a second embodiment, a VFG type generator is used to make a CVFR type source.

In a third embodiment, an induction regulator powered by a network with fixed voltage and variable frequency is used, and the quasi-static position of the rotor is slaved to the ratio of the voltage to the frequency.

DETAILED PRESENTATION OF PARTICULAR EMBODIMENTS

Figure 1:
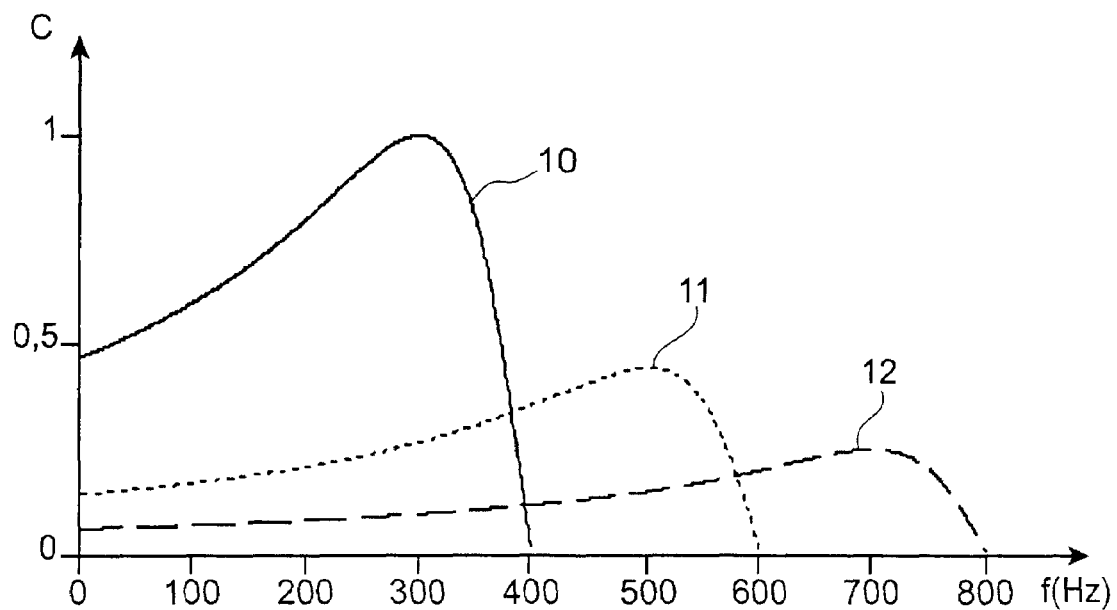
FIG. 1 shows a power supply with constant voltage and variable frequency for at least one induction machine.

FIG. 1 shows a constant voltage and variable frequency power supply for an induction machine. This figure shows the variation of the maximum torque of an induction machine that is a flux actuator force-driven by the power supply voltage and frequency, as a function of the voltage V and the frequency f. This torque C is defined by $C=k(V/f)^2$. The curves in FIG. 1 thus show the variation in the electromagnetic torque of an induction machine when the voltage is kept constant at 115 volts and when the frequency varies from 400 Hz to 800 Hz, curve 10 showing torque at 400 Hz, curve 11 showing torque at 600 Hz and curve 12 showing torque at 800 Hz. The maximum torque at 800 Hz is a quarter of the torque at 400 Hz, which confirms that this power supply mode is not desirable.

Figure 2:
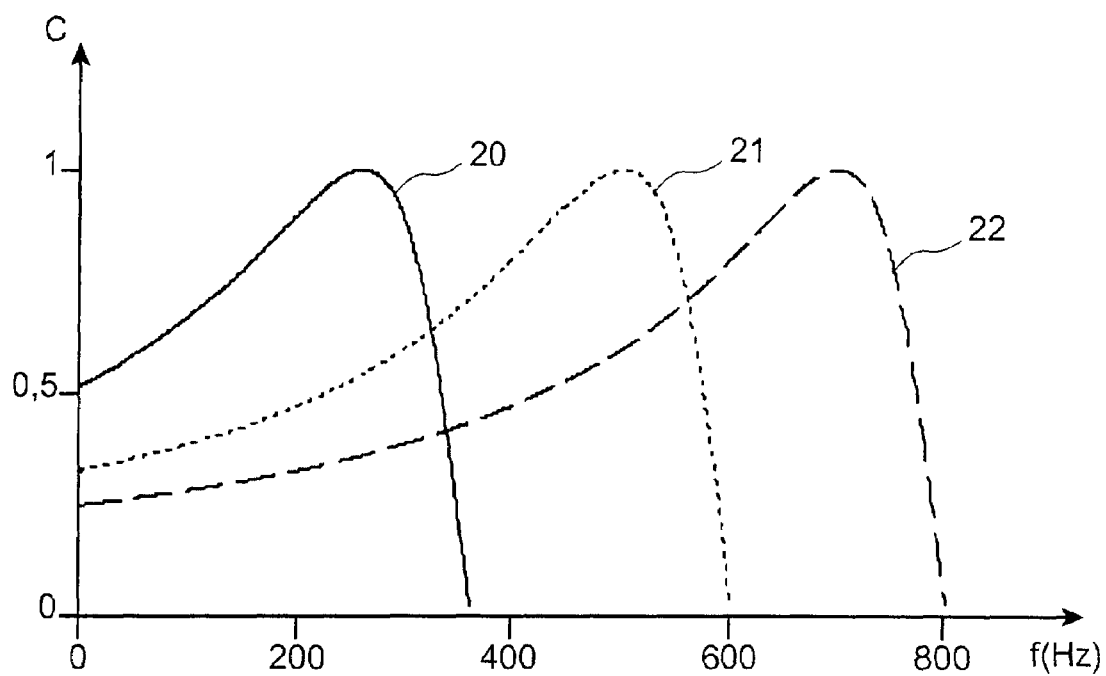
FIG. 2 shows a CVFR type power supply for an induction machine according to the invention.

The device according to the invention consists of using an induction machine powered by a CVFR (<<constant voltage-to-frequency ratio>>) type source in which the voltage and frequency vary, but in a ratio that is kept constant. The curve in FIG. 2 shows the variation of the electromagnetic torque of such a machine: curve 20 shows the torque at 115 volts and 400 Hz, curve 21 shows the torque at 172.5 volts and 600 Hz, and curve 22 shows the torque at 230 volts and 800 Hz. The maximum torque is unchanged over the entire frequency variation range. Nevertheless, the starting torque decreases, which can cause some problems in starting at full load.

Figure 3A:
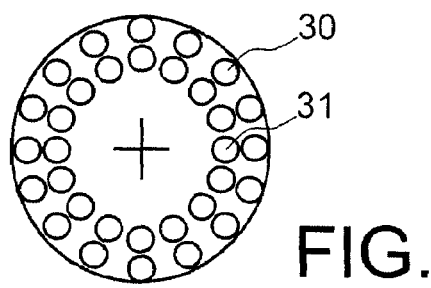
FIGS. 3A to 3C show a CVFR type power supply with a double cage motor.

FIG. 3A shows the detailed composition of a so-called <<double cage>> asynchronous motor. In this case, the motor is provided with a rotor composed of two concentric cages 30 and 31, the outer cage 30 having high resistance and low inductance; the inner cage 31 having low resistance and high inductance.

Figure 3B:
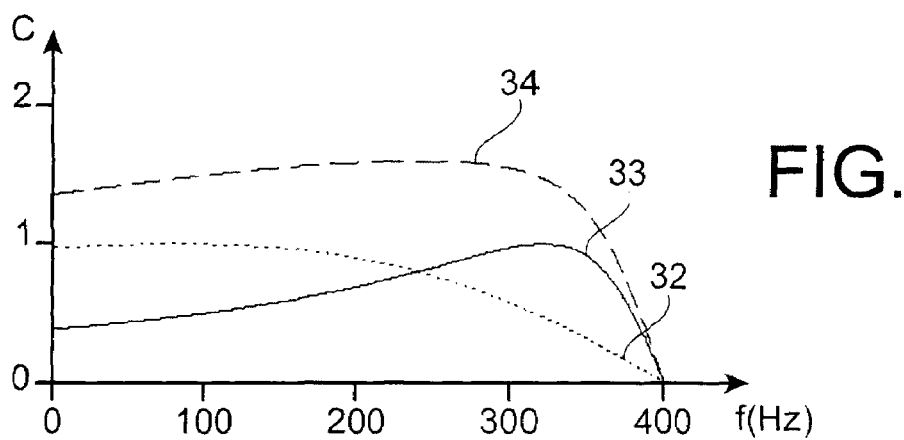

FIG. 3B shows the torques C produced by the two different cages, curve 32 being for the outer cage, curve 33 for the inner cage, curve 34 for the total torque.

When starting and at low rotation speeds (the slip is close to 1), the field variation is such that the field hardly penetrates into the rotor due to the skin effect, and only the outer cage 30 (low inductance and high resistance) has an influence. At high rotation speeds (the slip is close to 0), the field rotates slowly relative to the rotor and it penetrates deeply into it. At this moment, the inner cage 31 (low resistance and high inductance) exerts its influence while the impedance of the outer cage 30 is too high for high currents to develop in it. Therefore the outer cage loses its influence. At intermediate rotation speeds, the inner cage 31 and the outer cage 30 contribute to creating the torque. In all cases, the motor torque is given by the instantaneous sum of the torques produced by the inner and outer cages 31 and 30.

Figure 3C:
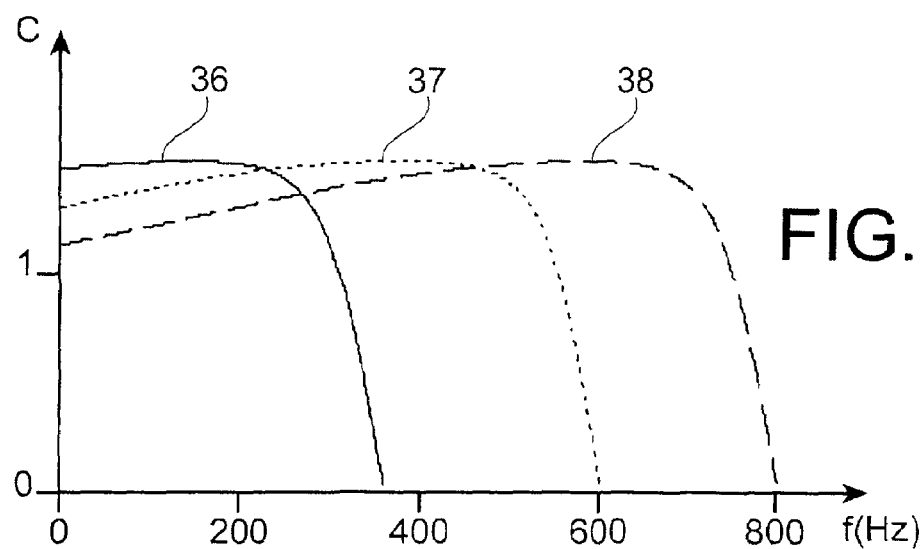

The curves in FIG. 3C show the frequency behaviour of a double cage motor powered by a CVFR type source conforming with the invention, curve 36 being for the torque at 115 volts, 400 Hz, curve 37 for the torque at 172.5 volts, 600 Hz and curve 38 for the torque at 330 volts, 800 Hz. One such device also considerably improves start up torques over the entire frequency range for possible starting at full load over the entire frequency range. This is also true for use of <<triple cage >> or <<deep slot>> motors.

Therefore the device according to the invention consists of supplying power to an induction machine using a CVFR (<<constant voltage-to-frequency ratio>>) type electrical source in which the voltage and frequency are both variable but in a constant or quasi-constant ratio, the maximum flux of the machine in the air gap being kept constant, consequently the maximum electromagnetic torque remaining unchanged.

The machine speed is variable and depends directly on the power supply frequency and the driven mechanical load, which is quite acceptable if the driven mechanical system (hydraulic or fuel electric pump) adjusts to a variable speed (addition of a variable inclination plate on the pump, self-regulated flow).

The machine start torque is lower at high frequencies than at low frequencies. But the use of an asynchronous motor with a <<double cage>>, <<triple cage>> or <<deep slots>> type rotor enables starting up at full load, the use of such a cage type technology enabling the motor to reduce its inrush current when starting, thus resulting in the loss of a few efficiency points. If the driven system is a wobble pump (variable flow pump), the initial position of the plate can be such that the resisting torque is minimal when starting (zero flow for the pump).

We will now consider several advantageous embodiments of the device according to the invention.

1. First Embodiment: Use of a Permanent Magnet Alternator

Figure 4:
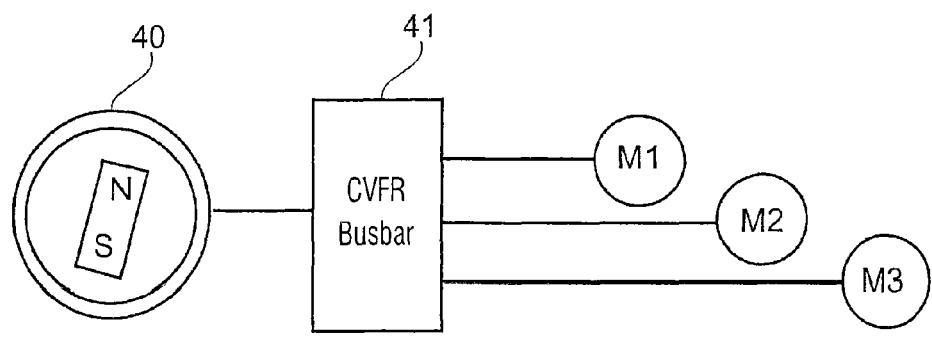
FIG. 4 shows a first embodiment of the device according to the invention.

This first embodiment is a simple, robust and advantageous solution. A CVFR type source is made using a Permanent Magnet Alternator (PMA) 40. As shown in FIG. 4, this alternator 40 supplies power for example to three induction machines M1, M2 and M3, through a CVFR busbar 41. Such an alternator 40 <<naturally>> generates a CFVR voltage because the electromotive force E (FEM) produced by the moving permanent magnets is directly proportional to the rotation frequency f of its mechanical shaft (E=k·f). If such an alternator is sized such that the induced reaction is low, the output voltage does not vary much with the load and it can be assumed that the voltage is practically constant at a given frequency.

Furthermore, such a permanent magnet alternator 40 has the advantage that it is not very sensitive to lightning, because it does not need any computers to control its excitation.

2. Second Embodiment: Use of a VFG Generator

Figure 5:
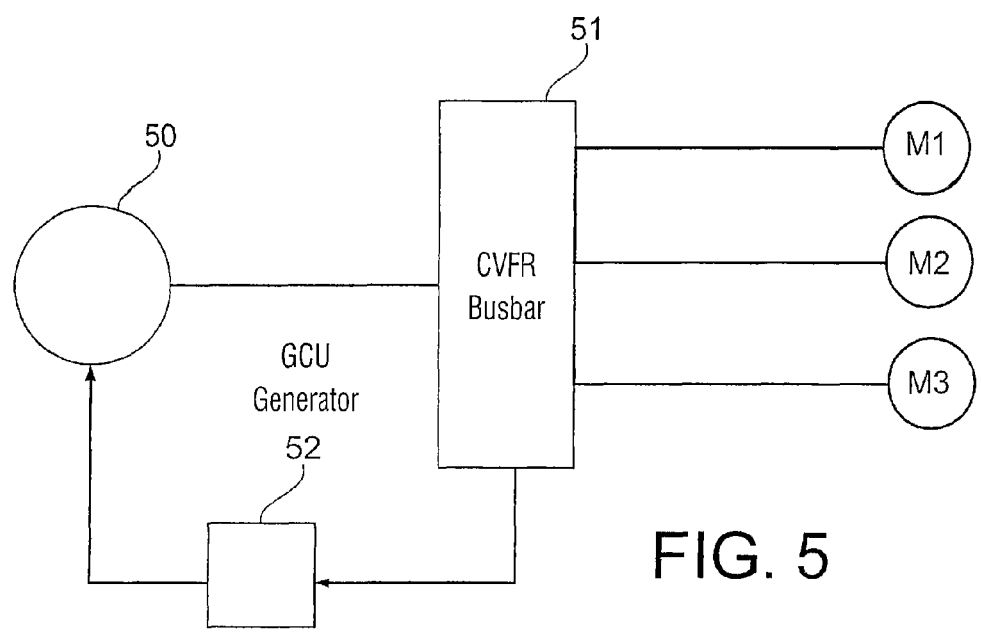
FIG. 5 shows a second embodiment of the device according to the invention.

In the second embodiment shown in FIG. 5, a VFG (<<Variable Frequency Generator>>) is used that powers a CVFR busbar 51 and that is controlled by a GCU <<Generator Control Unit>>) in one particular operating mode, namely CVFR mode. Instead of keeping the voltage at the Point Of Regulation (POR) when the frequency or load changes, a V/f=k (constant) law is applied to the excitation current such that the voltage V at the POR point becomes proportional to the frequency f measured by a GCU generator 52. Thus, the maximum value of the output voltage is slaved to the frequency f produced by action on the alternator excitation current. This solution has the advantage that it compensates for voltage variations due to the armature reaction of the generator 50 when the load current varies. In other words, the V/f ratio can reliably be kept constant.

3. Third Embodiment: Using an Induction Regulator

Figure 6A:
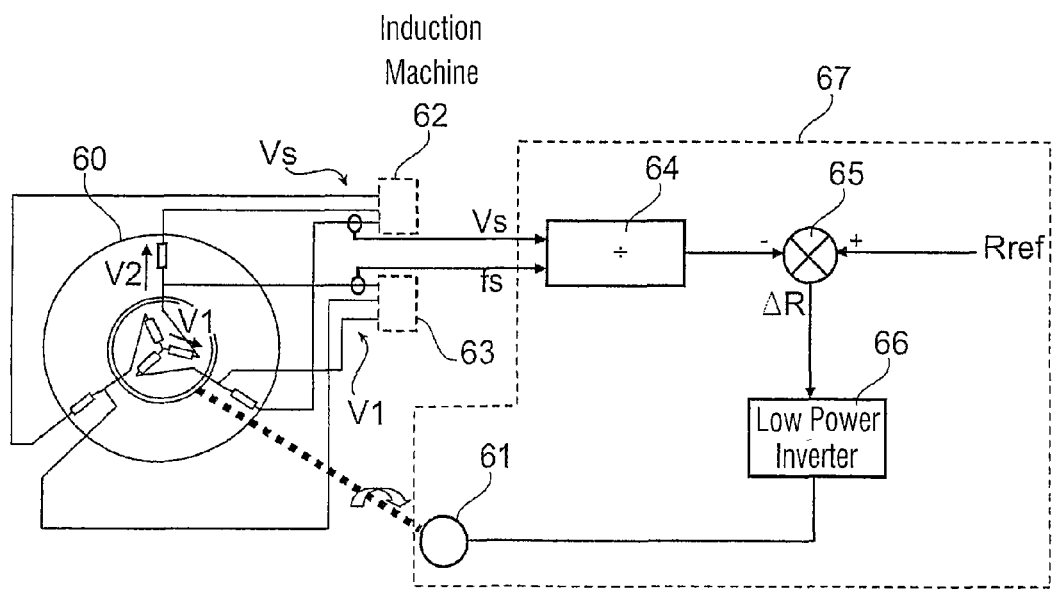
FIGS. 6A and 6B show a third embodiment of the device according to the invention.

The third embodiment shown in FIG. 6A consists of inserting an <<induction regulator>> type converter 60 (rotating field transformer) between the distribution bar and the induction machine.

This converter 60 is powered at constant voltage and variable frequency, its transformation ratio being slaved to the motor speed by a very low power actuator 61 (motor).

With this embodiment, there is no longer any need to dedicate a generator to CVFR type power supplies. It becomes possible to use the aircraft main generator to continue to supply power to conventional loads at fixed voltage and variable frequency.

With the converter 60, it becomes possible to create a distribution bar 63 dedicated to constant V/f ratio (CVFR) loads independently of the rest of the aircraft network.

Figure 6B:
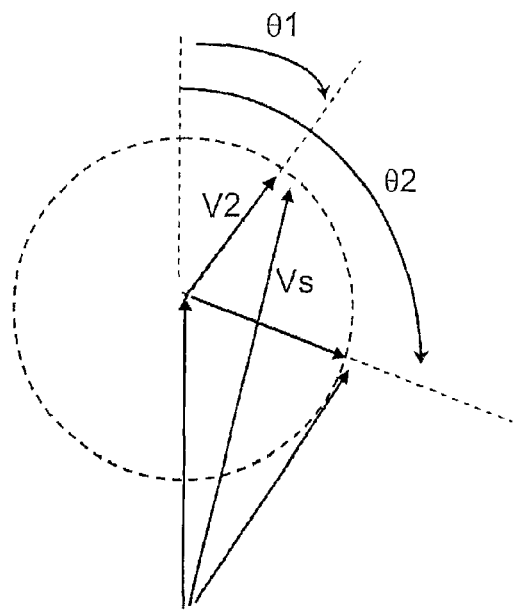

This embodiment uses an electromechanical structure similar to an asynchronous wound rotor converter, but in which the rotor is quasi-static. The position of this rotor is fixed for a given power supply frequency, but it can be modified when the power supply frequency of the system changes. The voltage V1 is the constant power supply voltage of the primary received from the distribution bar 63. The voltage V2 is the voltage auto-induced by the converter 60 through its secondary winding. As shown in FIG. 6B, the output voltage Vs is equal to the vector sum of the voltages V1 and V2 that will power the induction machine 62. An angular position θ corresponds to each given frequency and given load. This angle θ can be adjusted to vary the vector combination of V1 and V2 so as to maintain a constant Vs/f=(V1+V2)/f ratio (CVFR) due to the angular position slaving loop 67 shown in FIG. 6. This loop 67 comprises a divider 64 to calculate the Vs/f ratio, a means 65 of comparing with a reference ratio Rref, for example 115/400=0.288, and that outputs a difference in the ratio ΔR to a low power inverter 66 controlling the angular positioning actuator 61.

With such embodiments, an induction machine can be operated without power electronics by means of simple and very robust solutions without degrading the intrinsic reliability of the induction machine.

The invention claimed is:

1. A device for supplying electrical power to at least one induction machine on board an aircraft, in which a variable frequency electrical distribution bar supplies the at least one induction machine, the device comprising:
    at least one CVFR type source, in which the voltage and frequency are both variable but in a constant ratio, that supplies power to at least one induction machine, the at least one induction machine being an asynchronous motor with at least two cages, or an asynchronous motor with deep slots, and
    an induction regulator and an angular regulation loop.

2. A device according to claim 1, further comprising a permanent magnet alternator.

3. A device according to claim 1, further comprising a VFG type alternator controlled by a control generator.

4. A device according to claim 1, in which the angular regulation loop includes divider means for comparing with a reference value, a low power inverter, and an angular positioning actuator.

5. A device according to claim 1, in which the aircraft is an airplane.

6. An aircraft comprising a device according to claim 1.

7. A method for supplying electrical power to at least one induction machine on board an aircraft, in which a variable frequency electrical distribution bar supplies the at least one induction machine, the method comprising:
    supplying, by at least one CVFR type source in which the voltage and frequency are both variable but in a constant ratio, power to at least one induction machine, and the at least one induction machine is an asynchronous motor with at least one cage, or an asynchronous motor with deep slots, and
    using an induction regulator powered by a network with fixed voltage and variable frequency, and a quasi-static position of the rotor is slaved to the ratio of the voltage to the frequency.

8. A method according to claim 7, in which a permanent magnet alternator is used to make a CVFR type source.

9. A method according to claim 7, in which a VFG type generator is used to make a CVFR type source.

10. An aircraft comprising a device capable of using the method according to claim 7.

11. A device for supplying electrical power to at least one induction machine on board an aircraft, the device comprising:
    a variable frequency electrical distribution bar which supplies the at least one induction machine,
    at least one CVFR type source, in which the voltage and frequency are both variable but in a constant ratio, which supplies power to the at least one induction machine, which is an asynchronous motor, and
    a converter disposed between the distribution bar and the at least one induction machine, powered at constant voltage and variable frequency, and a transformation ratio of the converter is slaved by a very low power activator controlled by an angular position slaving loop.

12. A method for supplying electrical power to at least one induction machine on board an aircraft, in which a variable frequency electrical distribution bar supplies the at least one induction machine, the method comprising:
    supplying, by at least one CVFR type source in which the voltage and frequency are both variable but in a constant ratio, power to at least one induction machine, which is an asynchronous motor;
    powering at a constant voltage and variable frequency, a converter disposed between the distribution bar and the at least one induction machine; and
    slaving a transformation ratio of the converter by a very low power activator controlled by an angular position slaving loop.

* * * * *